(12) United States Patent
Lindoff et al.

(10) Patent No.: US 7,929,591 B2
(45) Date of Patent: Apr. 19, 2011

(54) METHOD AND APPARATUS FOR MULTIPLE SCRAMBLING CODE IMPAIRMENT COMPENSATION

(75) Inventors: Bengt Lindoff, Bjärred (SE); Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1211 days.

(21) Appl. No.: 11/552,573

(22) Filed: Oct. 25, 2006

(65) Prior Publication Data
US 2008/0101443 A1 May 1, 2008

(51) Int. Cl.
H04B 1/707 (2006.01)

(52) U.S. Cl. .......................................... 375/147
(58) Field of Classification Search .................. 375/130, 375/140, 147, 148, 150, 152, 346
See application file for complete search history.

(56) References Cited

U.S. PATENT DOCUMENTS

| | | | |
|---|---|---|---|
| 2004/0136342 A1* | 7/2004 | Pedersen et al. | 370/335 |
| 2005/0094816 A1* | 5/2005 | Lindoff et al. | 380/268 |
| 2005/0152486 A1 | 7/2005 | Wang | |
| 2005/0201447 A1 | 9/2005 | Cairns et al. | |
| 2005/0215218 A1* | 9/2005 | Bottomley et al. | 455/226.1 |
| 2008/0043680 A1* | 2/2008 | Fitton | 370/335 |

FOREIGN PATENT DOCUMENTS
WO WO 02/052743 7/2002

* cited by examiner

Primary Examiner — Kevin M Burd
(74) Attorney, Agent, or Firm — Coats & Bennett, P.L.L.C.

(57) ABSTRACT

In one or more embodiments, a receiver circuit generates impairment correlation estimates for a desired signal that are compensated for the use of different transmission scrambling codes in transmitting the desired signal and an associated pilot signal. In one embodiment, an impairment correlation estimation method comprises determining impairment correlation estimates from a pilot signal in a received CDMA signal, adapting the impairment correlation estimates for scrambling code effects if the desired signal and pilot signal are transmitted under different transmission scrambling codes, and performing one or more signal processing operations with respect to the desired signal based on the impairment correlation estimates. For example, in at least one embodiment, the receiver circuit is configured to compensate elements of an impairment correlation matrix that correspond to signal delays of the desired signal based on transmit power allocation differences between pilot and desired signal scrambling codes.

25 Claims, 3 Drawing Sheets

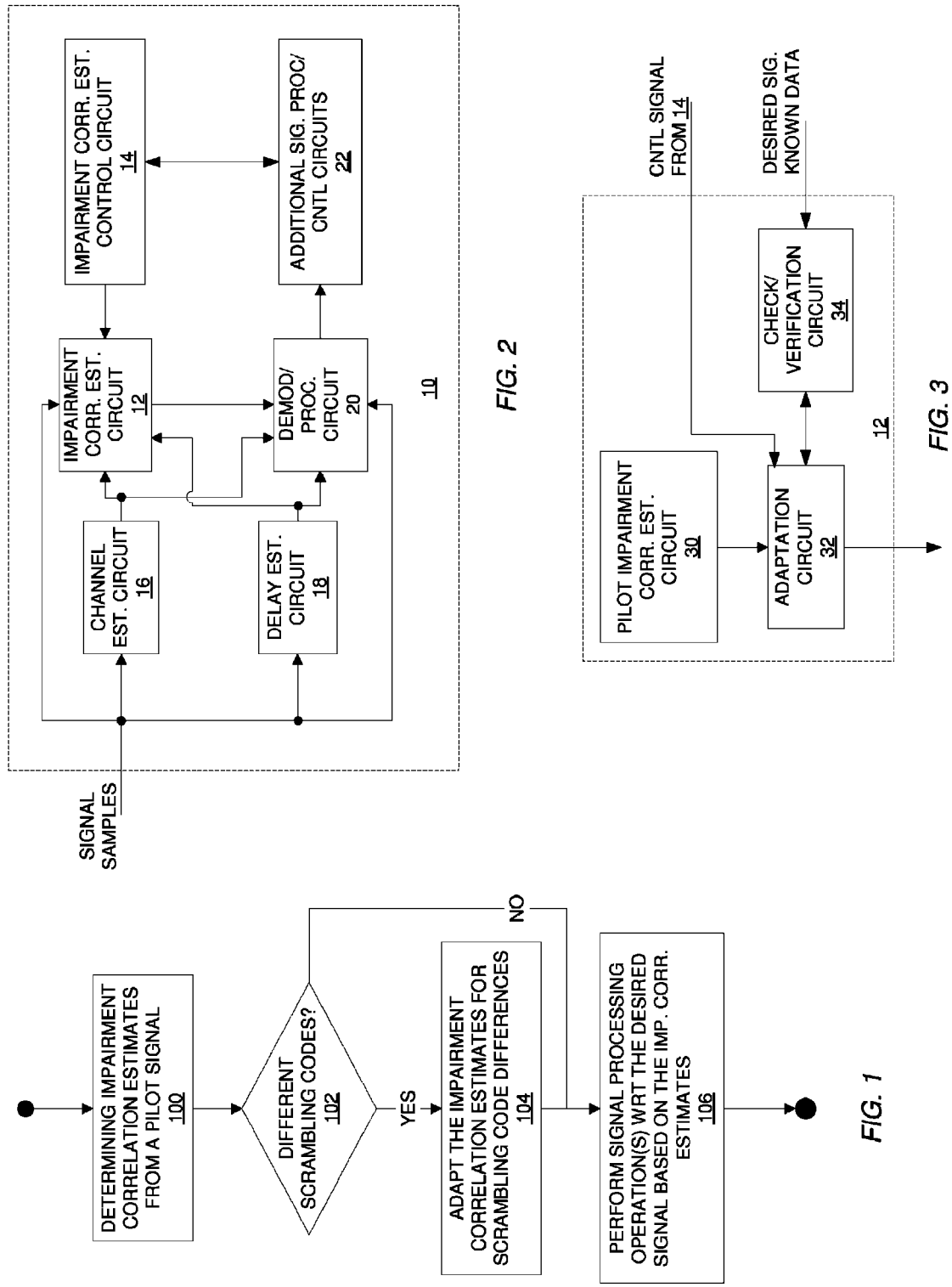

METHOD AND APPARATUS FOR MULTIPLE SCRAMBLING CODE IMPAIRMENT COMPENSATION

BACKGROUND

The present invention generally relates to communication receivers, and particularly relates to the use of multiple scrambling codes in parametric Generalized Rake (G-Rake) receivers, such as the use of primary and alternate scrambling codes in a wireless base station transmitter.

Known receiver techniques for exploiting multipath reception in Code Division Multiple Access (CDMA) communication systems, such as cellular communication networks based on the Wideband CDMA (W-CDMA) standards, include the "Rake" receiver architecture. In operation, a Rake receiver assigns individual despreader circuits, often referred to as Rake "fingers," to different path delays (taps) of a received multipath CDMA signal. A Rake combining circuit then combines the individual finger signals to form a combined signal having an improved signal-to-noise ratio if the finger signal noise is white.

Thus, the following equation represents Rake receiver operation with respect to a mobile station operating in a WCDMA network, assuming a multipath channel having d channel taps:

$$H_C = [h_0^C \ \ldots \ h_{d-1}^C]^T \quad \text{Eq. (1)}$$
$$H_D = [h_0^D \ \ldots \ h_{d-1}^D]^T$$

where $H_C$ represents the d×1 propagation channel vector for the Common Pilot Channel (CPICH), and $H_D$ represents the d×1 propagation channel vector for a Dedicated Physical Channel (DPCH) assigned to the mobile station.

With the channel vectors of Eq. (1), the below equation describes the received vector of despread signals for the Rake receiver:

$$Y = H_D u + E \quad \text{Eq. (2)}$$

where $Y = [y_t, y_{t-\tau_1}, \ldots, y_{t-\tau_{d-1}}]$, $H_D$ is the DPCH channel vector as given in Eq. (1) and is assumed to be constant over at least $N_C$ CPICH pilot symbols, u is the transmitted symbol of interest, and E represents a noise vector having a diagonal covariance matrix given as:

$$\Sigma = E(EE^H) = \text{diag}(\sigma_1^2, \ldots, \sigma_{d-1}^2) \quad \text{Eq. (3)}$$

where $E(\cdot)$ represents the expected value operation.

The Rake receiver uses the pilot symbols received on the CPICH to estimate the channel $H_C$ and the variance elements in $\Sigma$, and then scales $\Sigma$ using the spreading factor difference between the DPCH and the CPICH. The following equations yield these estimates as follows:

$$\hat{H}_C = H_C + E_{H_C}, \ E_{H_C} \in N\left(0, \frac{SF}{256 N_C}\Sigma\right) \quad \text{Eq. (4)}$$

$$\hat{\Sigma}_{ii} = \hat{\sigma}_i^2 = \frac{256}{SF}\frac{1}{N_C-1}\sum_{k=1}^{N_C}\left|y_k^i - \hat{h}_C^i u_k^{CPICH}\right|^2, \ i = 0, \ldots, d-1 \quad \text{Eq. (5)}$$

where $\hat{H}_C = \{\hat{h}_C^i\}$, $i=0, \ldots, d-1$ represents the CPICH channel estimate vector, SF is the spreading factor of the DPCH, and $\hat{\sigma}_i^2$ is normalized such that the expected value $E(\hat{\sigma}_i^2) = \sigma_i^2$.

Inserting the channel and interference estimates obtained from Eq. (4) and Eq. (5), respectively, in the Rake detector yields the following detector statistics for the Rake receiver:

$$D_{Rake} = \hat{H}_C^H \hat{\Sigma}^{-1} Y \quad \text{Eq. (6)}$$

From Eq. (6), one sees that the Rake receiver only estimates the propagation channel for the signal delays of interest and the corresponding interference (noise power) for each tap, as represented by the diagonal matrix $\Sigma$. Such operations yield optimal operation (maximum ratio combining) only if the finger signal noise is white. Those skilled in the art will appreciate that signal interference in WCDMA and other networks generally is not white because of same-cell and other interference terms.

More sophisticated receiver structures consider colored noise and other correlated signal impairments. Examples of such interference canceling receivers include chip equalizers and so-called "Generalized Rake" (G-Rake) receivers. Chip equalizers generally use a single received signal correlator, which is preceded by a whitening filter having a number of filter taps. With this arrangement, chip equalizers compensate for colored interference by calculating the filter tap weights at least partly based on measurements or estimations of colored interference in the received signal. Similarly, a G-Rake receiver suppresses colored interference by inserting additional "probing" fingers that are placed at delay positions not necessarily corresponding to tap delays of the multipath signal, and are used to estimate impairment correlations, including colored noise interference, for the on-path (data) finger signals.

Assuming a d tap channel with p probing fingers, the following equations define the CPICH and DPCH channel vectors, respectively:

$$H_C = [h_0^C \ \ldots \ h_{d-1}^C, 0 \ldots 0]^T \quad \text{Eq. (7)}$$

$$H_D = [h_0^D \ \ldots \ h_{d-1}^D, 0 \ldots 0]^T \quad \text{Eq. (8)}$$

Further, the received despread signal is given as, $$Y = H_D u + E \text{ where} \quad \text{Eq. (9)}$$
$$Y = [y_t, y_{t-\tau_1}, \ldots, y_{t-\tau_{d-1}}, y_{t-\tau_{p_0}}, \ldots, y_{t-\tau_{p_{p-1}}}],$$

with the d delays representing path delays for the received signal of interest and with the p delays representing the probing finger delays. Further, as before, $H_D$ is the DPCH channel vector and is assumed to be constant over at least $N_C$ CPICH pilot symbols, u is the transmitted symbol of interest, E is the noise and interference vector, and R is an m×m impairment correlation matrix, which may comprise a covariance matrix. ($\hat{R}$ equals the expected value $E(EE^H)$ and is normalized such that the expected value $E(\hat{R})=R$.)

In turn, the G-Rake receiver estimates the channel $H_C$ and the covariance matrix R using the pilot symbols received on the CPICH, and then scales those estimates based on the DPICH-to-CPICH spreading factor difference. The following equations represent such estimation:

$$\hat{H}_C = H_C + E_{H_C}, \ E_{H_C} \in N\left(0, \frac{SF}{256 N_C}R\right) \quad \text{Eq. (10)}$$

-continued $$\hat{R} = \frac{256}{SF} \frac{1}{N_C - 1} \sum_{k=1}^{N_C} (Y_k - \hat{H}_C u_k^{CPICH})(Y_k - \hat{H}_C u_k^{CPICH})^H \quad \text{Eq. (11)}$$

With the above channel and interference estimates, the G-Rake detector statistic is given as, $$D_{G\text{-}Rake} = \hat{H}_C{}^H \hat{R}^{-1} Y \quad \text{Eq. (12)}$$

The above statistic in comparison with the Rake detector statistic of Eq. (6) makes clear that the G-Rake receiver compensates for impairment correlations as represented by the impairment covariance matrix, R. The R term can be estimated directly, such as from measured impairment correlations, or can be estimated parametrically, such as from modeled noise terms. However, the direct or indirect use of pilot symbols received on the CPICH generally remains a common feature of G-Rake colored interference estimation for DPCH signals.

That CPICH dependence generally is not problematic where the DPCH differs from the CPICH in terms of spreading factor but relies on the same base station scrambling code. However, conventional G-Rake (and, likewise, chip equalizer) estimations of DPCH colored interference may be inaccurate in instances where the transmitting base station uses different scrambling codes for the DPCH and the CPICH. As a non-limiting example, the WCDMA specifications allow a base station to transmit using more than one scrambling code, such as a primary and secondary (or alternative) scrambling codes. Such operation is useful when, for example, the primary scrambling code channelization tree is full but the base station has power capacity to serve additional users. In such cases, the base station transmits one or more such additional channels using one or more additional scrambling codes, meaning that interference estimates determined at a receiving mobile station may be inaccurate to the extent that the additional scrambling codes are not considered.

The use of dedicated pilot or other known symbols represents one approach to more accurate interference estimation for DPCH and other channels that use scrambling codes different from that used for the CPICH. However, the relatively low number of DPCH pilots transmitted in a given interval of interest compromise the performance of this approach and can leave the resulting interference estimates noise prone and poorly suited for use in fast fading channel conditions.

SUMMARY

In one embodiment, a method of estimating impairment correlations for a desired signal in a received CDMA signal comprises determining impairment correlation estimates from a pilot signal in the received CDMA signal, and adapting the impairment correlation estimates for scrambling code effects if the desired signal and pilot signal are transmitted under different transmission scrambling codes. The method continues with performing one or more signal processing operations with respect to the desired signal based on the impairment correlation estimates. For example, a wireless communication device that includes a receiver circuit configured to generate the impairment correlation estimates is configured to use them in the calculation of received signal quality and/or signal combining weights for Generalized Rake combining or chip equalization filtering.

In one embodiment, determining impairment correlation estimates from a pilot signal in the received CDMA signal comprises determining an impairment covariance matrix from the pilot signal having diagonal elements corresponding to cross-correlation values between the impairment components received at different desired signal delays of interest, and having off-diagonal elements corresponding to impairment cross-correlation values between pairs of the desired signal delays of interest. In a Generalized Rake receiver embodiment, pilot fingers despread pilot values at the delays of interest, and the impairment power values and the cross-correlation values are determined from the despread pilot values. Similar processing takes place in chip equalizer embodiments, but for equalizer taps placed at the appropriate delays.

With those points in mind, adapting the impairment correlation estimates comprises compensating at least the diagonal elements of the impairment covariance matrix as a function of transmit power allocations for a first scrambling code used in transmitting the pilot signal and a second scrambling code used in transmitting the desired signal. For example, the first scrambling code comprises a primary base station scrambling code and the second scrambling code comprises an alternative base station scrambling code. More particularly, if the received signal processing delays, e.g., the Rake finger or chip equalizer tap spacing, are chip-spaced, then compensation is limited to the diagonal elements of the impairment covariance matrix. For non chip-spaced received signal processing delays, the diagonal elements and at least some of the off-diagonal elements of the impairment covariance matrix are compensated.

Generally, in one or more embodiments, adapting the impairment correlation estimates for different scrambling code effects comprises compensating elements of an estimated impairment correlation matrix that correspond to path delays of the desired signal. The compensation is based on one or more correction terms that depend on transmit power allocations for a first scrambling code associated with the pilot signal and a second scrambling code associated with the desired signal. At least one such embodiment calculates the compensation term(s) as proportional to the transmit power allocation for the first scrambling code, which may be the primary scrambling code in use at the transmitting base station. In such embodiments, compensation calculations may be simplified by approximating the transmit power allocation for the second, desired signal scrambling code as negligible compared to the power allocation for the first, pilot scrambling code.

By way of non-limiting example, a wireless communication device includes a receiver circuit that comprises one or more processing circuits that are configured to consider the effects of different scrambling codes used to transmit pilot and desired signals. In one or more embodiments, the receiver circuit is included in or associated with a Generalized Rake receiver. In one or more other embodiments, the receiver circuit is included in or associated with a chip equalization receiver. In either case, the wireless communication device comprises, in one or more embodiments, a mobile station or other communication terminal, module, or circuit that is configured for operation in a Wideband CDMA network or other type of wireless communication network.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a logic flow diagram of one embodiment of processing logic for adapting impairment correlation estimates for scrambling code differences between desired and pilot signals.

FIG. 2 is a block diagram of one embodiment of a wireless communication receiver, including an embodiment of a receiver circuit that is configured to adapt its impairment correlation estimates for scrambling code differences between desired and pilot signals.

FIG. 3 is a block diagram of one embodiment of the receiver circuit illustrated in FIG. 2.

DETAILED DESCRIPTION

Figure 4:
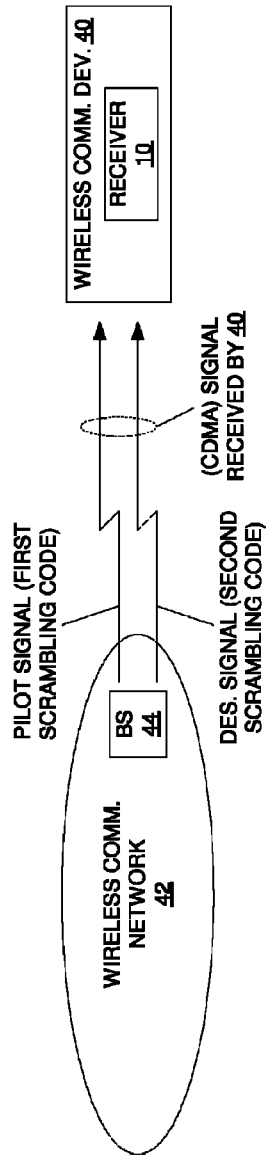
FIG. 4 is a block diagram of one embodiment of a wireless communication and a wireless communication device, which includes an embodiment of a receiver circuit configured to adapt its impairment correlation estimates for scrambling code differences.

FIG. 1 illustrates processing logic embodying a method of estimating impairment correlations for a desired signal in a received CDMA signal. As will be detailed later herein, such processing may be embodied in hardware or software, and may be implemented in a wireless communication device. By way of non-limiting example, the illustrated processing is carried out by a wireless communication device configured for operation in a Wideband CDMA (WCDMA) network, or other type of wireless communication network.

Processing "begins" in the illustrated embodiment with determining impairment correlation estimates from a pilot signal (Step 100). The pilot signal is received in conjunction with at least one "desired" signal, and, as a non-limiting example, the pilot signal comprises a Common Pilot Channel (CPICH) signal. If the pilot and desired signals are transmitted using different scrambling codes (Step 102), then the impairment correlation estimates generated from pilot signal samples do not necessarily reflect the impairment/interference conditions of the desired signal and the method continues with adapting the impairment correlation estimates for scrambling code differences (Step 104).

In at least one embodiment of such processing, the method continues with performing signal-processing operations with respect to (WRT) the desired signal based on the impairment correlation estimates (Step 106). By way of non-limiting example, received signal quality calculations incorporate or otherwise depend on the impairment correlation estimates, and therefore obtain accuracy improvements where the desired and pilot signals use different transmission scrambling codes. Additionally, or alternatively, (desired) signal combining weight calculations incorporate or otherwise depend on the impairment correlation estimates, and therefore obtain accuracy improvements where the desired and pilot signals use different transmission scrambling codes.

In one embodiment, determining impairment correlation estimates from the pilot signal in the received CDMA signal comprises determining impairment correlations directly from despread pilot values obtained from the pilot signal. For example, successive ones in a series of despread pilot values can be cross-multiplied/correlated to determine impairment correlations between them. Direct measurement of impairment correlations in this manner sometimes is referred to as "non-parametric" estimation.

Alternatively, one or more impairment correlation components are modeled, such as assuming predefined colored and white noise models for same-cell and other-cell interference terms, and a model fitting process provides impairment correlation estimates. In one non-limiting example, a "live" impairment correlation model updates based on fitting it to measured and possibly filtered impairment correlations, e.g., a Least Squares (LS) estimation process dynamically fits the model to changing impairment conditions as determined from rough, snapshot measurements of impairment correlation. Model-based impairment correlation in this manner is sometimes referred to a "parametric" estimation. The methods and apparatus taught herein for adapting impairment correlation estimates in compensation for the use of different pilot and desired signal scrambling codes contemplates both non-parametric and parametric determination of impairment correlation estimates.

Regardless of the particular method used for generating the pilot-based impairment correlation estimates, the estimates themselves are expressed in covariance matrix form in one or more embodiments. With that, determining impairment correlation estimates from a pilot signal in the received CDMA signal comprises determining an impairment covariance matrix. In a Generalized Rake receiver embodiment, impairment covariance matrix has diagonal elements corresponding to impairment power values for pilot fingers, and has off-diagonal elements corresponding to impairment cross-correlation values between pairs of fingers. In this context, adapting the impairment correlation estimates comprises compensating the diagonal elements corresponding to signal delays of the desired signal as a function of transmit power allocations for a first scrambling code used in transmitting the pilot signal and a second scrambling code used in transmitting the desired signal.

In at least one such embodiment, the above adaptation comprises calculating compensation terms, also referred to herein as correction or penalty terms, and using the compensation term(s) to revise the affected diagonal elements of the pilot-based impairment covariance matrix. Further, one or more embodiments simplify compensation of the diagonal elements of the covariance matrix by approximating a transmit power allocation for the second (desired signal) scrambling code as negligible compared to the transmit power allocation for the first (pilot) scrambling code, which allows the correction terms to be calculated as proportional to the pilot scrambling code transmit power allocation.

Broadly, then, in one or more embodiments, adapting the impairment correlation estimates for different scrambling code effects if the desired signal and pilot signal are associated with different transmission scrambling codes comprises compensating elements of an estimated impairment correlation matrix that represent the impairment power at the path delays of the desired signal. The correction term used in such compensation depends on transmit power allocations for a first scrambling code associated with the pilot signal and a second scrambling code associated with the desired signal. In WCDMA embodiments, for example, the second scrambling code may comprise an alternative scrambling code used when the channelization code tree under a primary scrambling code is full at the transmitting base station. In a more specific example of this circumstance, the desired signal comprises a Wideband CDMA (WCDMA) Dedicated Physical Channel (DPCH) signal transmitted using an alternate scrambling code. Further, the pilot signal comprises a WCDMA Common Pilot Channel Signal (CPICH) transmitted using a primary scrambling code.

The foregoing information is better understood in the context of more detailed examples. To that end, FIG. 2 illustrates one embodiment of a wireless communication receiver 10, which includes a receiver circuit, i.e., the impairment correlation estimation circuit 12, that is configured to adapt its impairment correlation estimates for scrambling code differences between a desired signal and an associated pilot signal. The impairment correlation estimation circuit 12 further includes, or is associated with, an impairment correlation estimation control circuit 14, which determines whether the impairment correlation estimation circuit 12 adapts its pilot-based impairment correlation estimates for desired/pilot signal scrambling code differences. In at least one embodiment, received signal information and/or other processing elements associated with the receiver 10 provide an indication of whether different transmit scrambling codes are being used for received pilot and desired signals to the impairment correlation estimation control circuit 14.

Additionally, the illustrated embodiment of the receiver 10 further includes a channel estimation circuit 16, a delay estimation circuit 18, a demodulation/processing circuit 20, and one or more additional signal processing and control circuits 22. In at least one embodiment, the channel estimation circuit 16 generates net and/or medium channel responses for use by the impairment correlation estimation circuit 12 in generating impairment correlation estimates, and by the demod./proc. circuit 20 in processing the received signal. Further, the delay estimation circuit 18 determines multipath propagation delays for the received signal, such as by generating Power Delay Profile (PDP) information identifying the strongest delay paths of the received signal.

In at least one embodiment, the demod./proc. circuit 20 demodulates the received signal for desired signal by despreading it using a corresponding channelization code, to generate soft bit values corresponding to detected symbols. The additional signal processing and control circuits 22 include, for example, a decoding circuit that is configured to decode the soft bit values for recovery of transmitted traffic, control, or signaling data from the received signal. Of course, the additional signal processing and control circuits 22 may include, or otherwise may be associated with, any number of additional circuits not illustrated, such as system control and user interface circuits where the receiver 10 resides in a wireless communication device or other system.

Turning to FIG. 3, one sees details for an embodiment of the impairment correlation estimation circuit 12 comprising one or more processing circuits, including a pilot impairment correlation estimation circuit 30, an adaptation circuit 32, and a check/verification circuit 34. The impairment correlation estimation circuit 12 is configured to determine impairment correlation estimates from a pilot signal in the received CDMA signal, and the adaptation circuit 32 is configured to adapt the impairment correlation estimates for scrambling code effects if the desired signal and pilot signal are transmitted under different transmission scrambling codes. For example, in one embodiment it does or does not carry out the impairment correlation estimate adaptation in dependence on a control signal or indicator generated by the impairment correlation estimation control circuit 14.

The check/verification circuit 34, if included, provides a mechanism to evaluate the adaptation of the impairment correlation estimates by the adaptation circuit 32. As noted earlier, adaptation may be based on differences in transmit power allocation between the scrambling code associated with the desired signal and the scrambling code associated with the pilot signal. Not exclusively, but particularly where adaptation relies on the simplifying assumption that only a small fraction of power is allocated to the scrambling code used for the desired signal, the correction term used in adaptation may not be as accurate as desired. For example, the transmitting base station may be transmitting a significant number of signals using one or more scrambling codes in addition to the (primary) scrambling code used for the pilot signal and other channel signals collected under the primary scrambling code tree. In such scenarios, the simplifying assumption of little or no appreciable transmit power being allocated to desired signal's scrambling code is not appropriate.

Thus, in one or more embodiments, adapting the impairment correlation estimates for scrambling code effects if the desired signal and pilot signal are transmitted under different transmission scrambling codes comprises comparing the impairment correlation estimates after adaptation with calculated impairment correlations. These calculated impairment correlation estimates are determined from known data received in the desired signal. For example, the desired signal may be a DPCH signal that includes embedded pilots or other known information that serve as the basis for impairment correlation characterization directly on the DPCH. Note, however, that DPCH pilot information typically is low rate, making this approach more suitable as a check for adaptation accuracy rather than as the primary mechanism for characterizing DPCH impairment correlations.

Regardless, the comparison between the corresponding adapted impairment correlation estimates and the directly calculated impairment correlation estimates provides a basis for choosing which estimates to use. That is, the impairment correlation estimation circuit 12 outputs the adapted correlation estimates if they accurately approximate the calculated impairment correlations or otherwise outputs the calculated impairment correlations, at least for those elements of an impairment correlation matrix corresponding to the adapted values.

Of course, whether based on adapted pilot-based values or directly calculated values, the impairment correlation estimates support any number of received signal processing operations. For example, the received signal quality calculations include or otherwise depend on the impairment correlation estimates, so that the calculated signal quality reflects the interference suppression effects gained through knowledge of the received signal impairment correlations. Further, the impairment correlation estimates support received signal demodulation in both Generalized Rake receiver and chip equalizer (CEQ) receiver architectures.

To better understand these and other applications, the parametric G-Rake implementation for scrambling code affects is detailed in the below example, and with reference made to FIG. 4. However, it should be understood that such operations directly apply to CEQ receivers. Further, the example assumes chip-spaced despreader delays, which simplifies the presentation but does not limit the more general processing method because the impairment correlation matrix (e.g., covariance matrix) construction generalizes to arbitrary finger and path space, where the effect of receiver pulse shape must be considered.

FIG. 4 illustrates a wireless communication device 40, e.g., a cellular radiotelephone, pager, PDA, computer network card, or other terminal, module, or device having wireless communication capability. The wireless communication device 40 includes an embodiment of the previously illustrated receiver 10, including an embodiment of the impairment correlation estimation circuit 12 configured to adapt pilot-based impairment correlation estimates for the use of different scrambling codes between pilot and desired signals.

For example, FIG. 4 further illustrates a wireless communication network 42, e.g., all or part of a WCDMA communication network, which includes a Base Station (BS) 44 transmitting a CDMA signal that is received by the wireless communication device 40. As those skilled in the art will appreciate, the received CDMA signal represents a composite of one or more signals differentiated by channelization code and, possibly, by scrambling code. In the illustrated example, the BS 44 transmits a pilot signal using a first scrambling code, and a desired, e.g., data, signal using a second scrambling code. In a specific WCDMA embodiment, the BS 44 transmits a CPICH signal using a Primary Scrambling Code (PSC) and transmits a DPCH or other user signal to the wireless communication device 40 using an Alternate Scrambling Code (ASC).

In practice, the BS 44 transmits a number of signals separated by different channelization codes under the PSC and may transmit one or more signals separated by different channelization codes under the ASC. Typically, the number of signals transmitted under an ASC is much smaller than transmitted under the PSC. For example, if additional BS transmit power is available after the channelization code tree under the PSC is exhausted, the BS 44 may transmit one or more additional coded signals using an ASC. In such instances, the transmit power allocation for the ASC-based signals typically is much smaller than the transmit power allocation for the PSC-based signals.

In any case, it will be appreciated that the wireless communication network is organized into a number of cells or sectors, and that potentially many BSs transmit CDMA signal, meaning that the wireless communication device 40 receives the CDMA signal from the BS 44 subject to various sources of interference and noise, more generally referred to as impairments. Typical impairment components include Multi-User Interference (MUI) and Inter-Symbol Interference (ISI). More broadly, impairment components include same-cell interference, other-cell interference, and noise, and at least some of these components exhibit potentially strong correlations.

Figure 5:
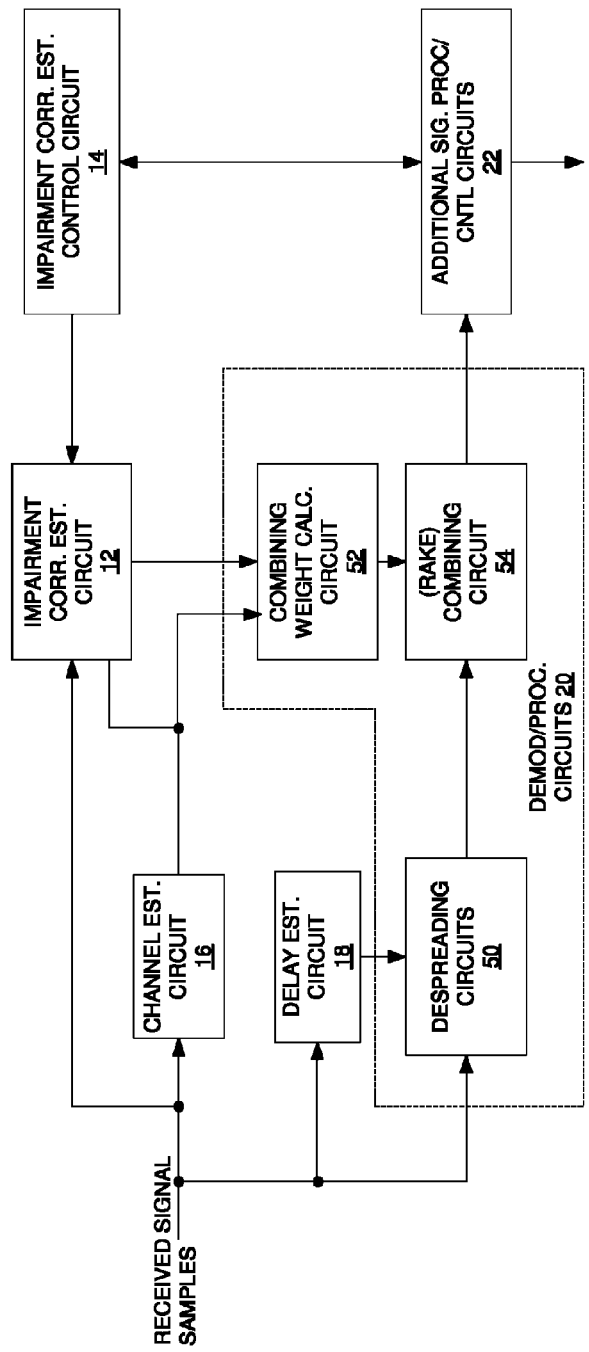
FIG. 5 is a block diagram of one embodiment of a Generalized Rake (G-Rake) receiver circuit that includes or is associated with an embodiment of a receiver circuit configured to adapt its impairment correlation estimates for scrambling code differences.

FIG. 5 provides a basis for discussing the estimation of such impairment correlations in the context of a Generalized Rake (G-Rake) receiver embodiment of the previously illustrated receiver 10. That is, in this embodiment, the demod./proc. circuits 20 comprise a G-Rake receiver circuit that includes despreading circuits 50, a combining weight calculation circuit 52, and a (Rake) combining circuit 54.

The despreading circuits 50 include a number of assignable despreading circuits or fingers, with one or more of the fingers assigned to each path delay of interest for the received CDMA signal. The fingers in the despreading circuits 50 typically are configured with channelization codes corresponding to one or more desired signals, and thus despread traffic, control, or other data. Conversely, the channel estimation circuit 16 also includes a number of despreaders, but these are configured with pilot channelization code(s). Some of these fingers are assigned to signal path delays for channel estimation, while others are used as probing fingers in support of impairment correlation estimation.

With these Rake processing details in mind, conventional impairment correlation estimates as modeled from the CPICH channel estimates generally include an implicit assumption of a single (primary) scrambling code and can be expressed as $$(R)_{ij} = \sum_{l=0}^{L-1}\sum_{q=0}^{L-1} h_l h_q^* \sum_{m=-\infty, m\neq 0}^{m=\infty} P(d_i - mT_c - \tau_l)P^*(d_j - mT_c - \tau_q) \quad \text{Eq. (13)}$$

where $d_i$ denote the delay of despreader i, $\tau_i$ the delay of (signal) path i, L the total number of signal paths of interest, such as identified by the delay estimation circuit 18, and $P(\bullet)$ the Transmit/Receive pulse shape autocorrelation function. (Note that autocorrelation here is non-limiting and based on the assumption that the transmit and receive filter pulse shapes match.) Further, $T_c$ denotes the spreading chip period of the received signal.

With Eq. (13) in mind, if several scrambling codes are being used at a given transmitter, e.g., BS 44 transmits one or more signals under the PSC and one or more signals under an ASC, then the impairment correlation expression for the PSC at the wireless communication device 40 is $$(R^p)_{ij} = \sum_{l=0}^{L-1}\sum_{q=0}^{L-1} h_l \quad \text{Eq. (14)}$$

$$h_q^* \left( \frac{I_{or}^p}{I_{or}} \sum_{m=-\infty, m\neq 0}^{m=\infty} P(d_i - mT_c - \tau_l)P^*(d_j - mT_c - \tau_q) + \frac{I_{or}^a}{I_{or}} \sum_{m=-\infty}^{m=\infty} P(d_i - mT_c - \tau_l)P^*(d_j - mT_c - \tau_q) \right)$$

where the "p" superscript denotes the PSC, the superscript "a" denotes the ASC, $I_{or}$ corresponds to the total transmit power allocated at the BS 44 for the combined transmissions under the PSC and ASC, such that $I_{or}^p$ and $I_{or}^a$ correspond to the transmit power allocations from $I_{or}$ for PSC and ASC transmission respectively.

With simplification, Eq. (14) is expressed as $$(R^p)_{ij} = \quad \text{Eq. (15)}$$

$$\sum_{l=0}^{L-1}\sum_{q=0}^{L-1} h_l h_q^* \left( \sum_{m=-\infty, m\neq 0}^{m=\infty} P(d_i - mT_c - \tau_l)P^*(d_j - mT_c - \tau_q) + \frac{I_{or}^a}{I_{or}} P(d_i - \tau_l)P^*(d_j - \tau_q) \right) \text{Thus,}$$

$$(R^p)_{ij} = (R)_{ij} + \frac{I_{or}^a}{I_{or}} \sum_{l=0}^{L-1}\sum_{q=0}^{L-1} h_l h_q^* P(d_i - \tau_l)P^*(d_j - \tau_q) \quad \text{Eq. (16)}$$

Similarly, the impairment correlation estimates for the ASC are given as $$(R^a)_{ij} = (R)_{ij} + \frac{I_{or}^p}{I_{or}} \sum_{l=0}^{L-1}\sum_{q=0}^{L-1} h_l h_q^* P(d_i - \tau_l)P^*(d_j - \tau_q) \quad \text{Eq. (17)}$$

Eq. (16) illustrates that impairment correlation estimates for code channels received under the PSC are, for the ith and jth delays, given as the "generic" CPICH-based impairment correlation estimate, $(R)_{ij}$, as adapted by the compensation term $$\frac{I_{or}^a}{I_{or}} \sum_{l=0}^{L-1}\sum_{q=0}^{L-1} h_l h_q^* P(d_i - \tau_l)P^*(d_j - \tau_q) \quad \text{Eq. (18)}$$

Those skilled in the art will immediately appreciate that the compensation or correction term given by Eq. (18) is proportional to the transmit power allocation of the ASC, i.e., $I_{or}^a/I_{or}$ represents a proportionality weighting that depends on the fractional allocation of total base station transmit power used for transmitting signals under the ASC. Similarly, Eq. (17) illustrates that the impairment correlation estimates for code channels received under the ASC are, for the ith and jth delays, given as the "generic" CPICH-based impairment correlation estimate, $(R)_{ij}$, as adapted by the compensation term $$\frac{I_{or}^p}{I_{or}} \sum_{l=0}^{L-1} \sum_{q=0}^{L-1} h_l h_q^* P(d_i - \tau_l) P^*(d_j - \tau_q) \qquad \text{Eq. (19)}$$

Those skilled in the art will immediately appreciate that the compensation or correction term given by Eq. (19) is proportional to the transmit power allocation of the PSC, i.e., $$\frac{I_{or}^p}{I_{or}}$$

represents a proportionality weighting that depends on the fractional allocation of total base station transmit power used for transmitting signals under the PSC.

Eq. (19) thus offers a basis for adapting "generic" pilot-based impairment correlation estimates to improve the accuracy of those estimates for a desired signal transmitted under a different scrambling code than was used for the pilot signal on which the channel estimates and the generic impairment correlation estimates are based. Namely, such adaptation comprises, in one or more embodiments taught herein, compensating or otherwise correcting the elements in a generic covariance matrix, R, generated for all delays i, j of interest as given in Eq. (13), based on a correction term that depends on the transmit power allocations of the pilot scrambling code and the desired signal scrambling code. More particularly, the correction term is proportional to the power allocation of the pilot scrambling code with respect to the total or overall power allocation of the transmitting base station.

Because the typical power allocation given to ASC transmission typically is small as compared to PSC transmission at BS 44, one may invoke the simplifying assumptions that $I_{or}^a \ll I_{or}^p$. Additionally, if the fingers are chip-spaced—the distance between any two fingers is an integer multiple of the chip period—then $$P(d) = \begin{cases} 1, & d = 0 \\ 0, & d \neq 0 \end{cases}.$$

With these assumptions, the adapted impairment correlation estimates for use in processing a desired signal received under an ASC is given by $$(R^a)_{ii} = \qquad \text{Eq. (20)}$$
$$\begin{cases} |h_i|^2 I_{or} + (R^p)_{ii} & \text{where } i \text{ corresponds to a signal finger} \\ (R^p)_{ii} & \text{otherwise} \end{cases}$$

From Eq. (20), one sees that the adaptation of the pilot-based impairment correlation estimates applies to those diagonal elements of the impairment covariance matrix that describe the impairment power associated with the signal delays.

Figure 6:
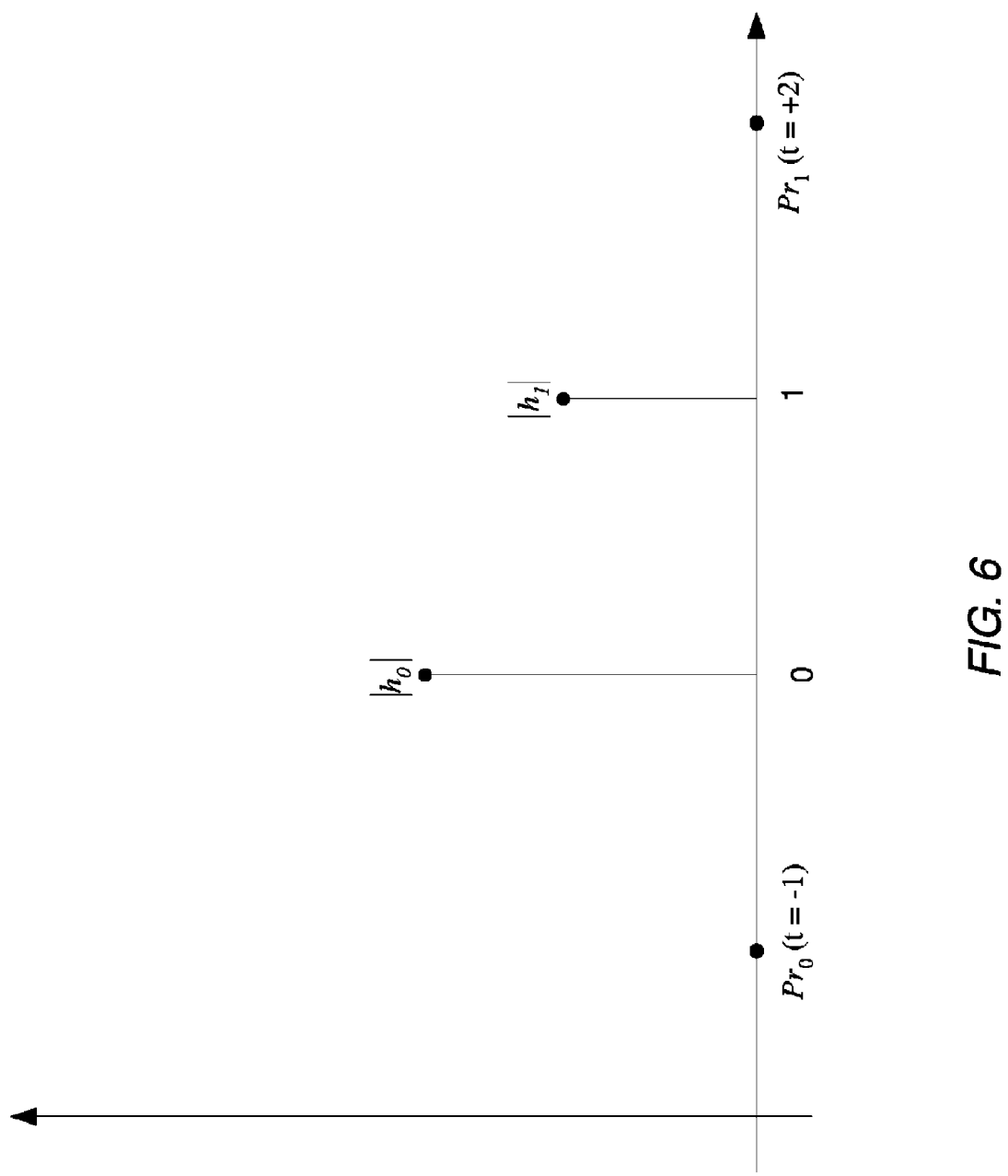
FIG. 6 is a diagram of a hypothetical Power Delay Profile (PDP) for a two-tap propagation channel.

FIG. 6 illustrates a hypothetical, two-tap path delay diagram for a received signal, and provides a basis for more practically illustrating the adaptation operations supported by the above equations. More particularly, FIG. 6 illustrates a PDP for multipath signal delays 0 and 1, and illustrates the placement of probing fingers ($Pr_0$ and $Pr_1$) at relative delays of −1 and +2.

With the radio channel illustrated in FIG. 6, the signal delays of interest are at time positions 0 and 1 (chips), respectively. Assuming the pilot signal is associated with the PSC and the desired signal is associated with an ASC, the corresponding channel estimates generated by the channel estimation circuit 16 therefore are $h_0$ and $h_1$, and the received CDMA signal at time t is given as, $$y(t) = h_0 \left( p_t \sum_i \gamma_i^p c_i u_i + a_t \sum_j \gamma_j^a c_j u_j \right) + \qquad \text{Eq. (21)}$$
$$h_1 \left( p_{t-1} \sum_i \gamma_i^p c_i u_i + a_{t-1} \sum_j \gamma_j^a c_j u_j \right) + e_t$$

where $e_t$ is the noise, $p_t$ is the PSC at time t, $a_t$ is the ASC at time t, $(\gamma_i^p)^2$ is the power for channelization code i ($c_i$) sorted under the PSC code tree, $(\gamma_j^a)^2$ is the power for channelization code j ($c_j$) sorted under the ASC code tree, $u_i$ is the transmitted symbol from code (user) i, and $u_j$ is the transmitted symbol from code (user) j.

From Eq. (21), one sees that the total base station transmit power for BS 44 can be expressed as $$I_{or} = I_{or}^p + I_{or}^a = \sum_i (\gamma_i^p)^2 + \sum_j (\gamma_j^a)^2 \qquad \text{Eq. (22)}$$

Further, as previously noted, the number of code channels transmitted under the ASC typically is much smaller than the number transmitted under the PSC, thus the adaptation calculations can take advantage of the simplifying assumption $$I_{or}^p = \sum_i (\gamma_i^p)^2 \gg I_{or}^a = \sum_j (\gamma_j^a)^2 \qquad \text{Eq. (23)}$$

For G-Rake reception with the two probing fingers placed at delay times −1 and +2, the CPICH signal is despread for delays −1, 0, 1, 2, which yields the following actual impairment correlation estimates, expressed in impairment covariance matrix form as $$R^p = \begin{bmatrix} (|h_0|^2 + |h_1|^2)I_{or} & h_1 h_0^* & 0 & 0 \\ h_1 h_0^* & |h_0|^2 I_{or}^a + |h_1|^2 I_{or} & 0 & 0 \\ 0 & 0 & |h_1|^2 I_{or}^a + |h_0|^2 I_{or} & h_1 h_0^* \\ 0 & 0 & h_1 h_0^* & (|h_0|^2 + |h_1|^2)I_{or} \end{bmatrix} + N_0 I \quad \text{Eq. (24)}$$

From Eq. (24), one sees that the row 2, col. 2 (2,2) and row 3, col. 3 matrix elements are influenced by the ASC, while the remaining elements either are zero, or are dependent on the total base station power, rather than particular ASC or PSC power allocations.

Assuming that the desired signal is a DPCH sorted under the ASC, then the R matrix for the DPCH signal is given as $$R^a = \begin{bmatrix} (|h_0|^2 + |h_1|^2)I_{or} & h_1 h_0^* & 0 & 0 \\ h_1 h_0^* & |h_0|^2 I_{or}^p + |h_1|^2 I_{or} & 0 & 0 \\ 0 & 0 & |h_1|^2 I_{or}^p + |h_0|^2 I_{or} & h_1 h_0^* \\ 0 & 0 & h_1 h_0^* & (|h_0|^2 + |h_1|^2)I_{or} \end{bmatrix} + N_0 I \quad \text{Eq. (25)}$$

Again, one sees that only the diagonal elements involving only signal finger delays depend on the PSC/ASC scrambling code differences, which are expressed as a function of transmit power allocations differences between the PSC and ASC. More particularly, the affected diagonal elements include a term that is proportional to the PSC transmit power allocation.

Relying on the assumption $I_{or}^p \gg I_{or}^a$, and hence $I_{or}^p \approx I_{or}$ and $I_{or}^a \approx 0$, the adaptation of the affected diagonal elements in the impairment correlation estimates for the desired signal can be implemented using the relationship given in Eq. (20) and repeated below for convenience $$(R^a)_{ii} = \begin{cases} |h_i|^2 I_{or} + (R^p)_{ii} & \text{where } i \text{ corresponds to a signal finger} \\ (R^p)_{ii} & \text{otherwise} \end{cases} \quad \text{Eq. (26)}$$

Note that the channel estimates h are provided by the channel estimation circuit 16, and the base station power $I_{or}$ can be computed, determined, or otherwise ascertained using techniques well known in the wireless communication arts. Further, those skilled in the art will appreciate that the two-tap example extends easily to an arbitrary number of taps, and that earlier details given herein illustrate the adaptation with the simplifying assumption of $I_{or}^a \approx 0$.

With all of the above in mind, it will be understood that the baseband received signal samples are fed into the demod./proc. circuits 20, which comprise the G-Rake receiver embodiment illustrated in FIG. 5, for example. The baseband received signal also is fed into the channel estimation circuit 16 for channel estimation and pilot-based impairment correlation estimation, using the CPICH or other pilot signal as sorted under the PSC. In this context, the impairment correlation estimation control circuit 14 provides an indication to the impairment correlation estimation circuit 12 as to whether the desired signal (e.g., DPCH) is sorted under a different scrambling code tree than the pilot signal (e.g., ASC versus PSC).

The scrambling code circumstances can change dynamically during operation of the receiver 10, and information from higher layer signaling can be used to drive the impairment correlation estimation control circuit 14, so that it appropriately enables or disables adaptation of the impairment correlation estimates by the impairment correlation estimation circuit 12. As one example, if the wireless communication device 40 operates temporarily in the WCDMA "compressed" mode, the DPCH (desired) signal is sorted under a different spreading code than the CPICH only in the compressed frames. Thus, adaptation may be enabled for receiving compressed DPCH frames and disabled for receiving non-compressed DPCH frames, which normally are sorted under the same scrambling code as the CPICH. Of course, these and other details correspond to particular embodiments of the adaptation method taught herein, and should be understood as non-limiting.

More broadly, in one or more embodiments, the teachings herein illustrate a method and corresponding apparatus for determining impairment correlations for a desired signal. That method comprises estimating an impairment correlation matrix based on a pilot signal received in conjunction with the desired signal, and compensating selected elements of the impairment correlation matrix corresponding to signal delays of the desired signal for transmission scrambling code differences between the pilot and desired signals. As such, the present invention is not limited by the foregoing discussion or by the accompanying drawings. Rather, the present invention is limited only by the following claims and their reasonable legal equivalents.

What is claimed is:

1. A method of estimating impairment correlations for a desired signal in a received CDMA signal, the method comprising:
   determining impairment correlation estimates from a pilot signal in the received CDMA signal by determining an impairment covariance matrix from the pilot signal having diagonal elements corresponding to cross-correlation values between the impairment components received at different desired signal delays of interest, and having off-diagonal elements corresponding to impairment cross-correlation values between pairs of the desired signal delays of interest;
   adapting the impairment correlation estimates for effects of transmitting the desired signal with a different scrambling code than used for transmitting the pilot signal; and performing one or more signal processing operations with respect to the desired signal based on the impairment correlation estimates.

2. The method of claim 1, wherein determining impairment correlation estimates from a pilot signal in the received CDMA signal comprises one of determining impairment correlations non-parametrically from despread pilot values obtained from the pilot signal and determining impairment correlations parametrically from despread pilot values obtained from the pilot signal.

3. The method of claim 1, further comprising generating channel estimates from the pilot signal.

4. The method of claim 1, wherein adapting the impairment correlation estimates for the effects of different scrambling codes being used to transmit the desired signal and the pilot signal comprises compensating at least the diagonal elements of the impairment covariance matrix as a function of transmit power allocations for a first scrambling code used in transmitting the pilot signal and a second scrambling code used in transmitting the desired signal.

5. The method of claim 4, wherein compensating at least the diagonal elements of the impairment covariance matrix as a function of transmit power allocations for a first scrambling code used in transmitting the pilot signal and a second scrambling code used in transmitting the desired signal comprises limiting compensation to the diagonal elements if the received signal processing delays are chip-spaced, and compensating the diagonal elements and one or more off-diagonal elements if the received signal processing delays are not chip-spaced.

6. The method of claim 4, further comprising simplifying compensating the diagonal elements of the covariance matrix by approximating a transmit power allocation for the second scrambling code as negligible compared to a transmit power allocation for the first scrambling code.

7. The method of claim 1, wherein performing one or more signal processing operations with respect to the desired signal based on the impairment correlation estimates comprises at least one of computing a received signal quality for the desired signal as a function of the impairment correlation estimates, and computing weighting values for signal whitening in an associated Generalized Rake combining or chip equalization process.

8. The method of claim 1, wherein adapting the impairment correlation estimates for the effects of transmitting the desired signal with a different scrambling code than used for transmitting the pilot signal comprises compensating elements of an estimated impairment correlation matrix that correspond to path delays of the desired signal based on a correction term that depends on transmit power allocations for a first scrambling code associated with the pilot signal and a second scrambling code associated with the desired signal.

9. The method of claim 1, wherein the desired signal comprises a Wideband CDMA (WCDMA) Dedicated Physical Channel (DPCH) signal transmitted using an alternate scrambling code and the pilot signal comprises a WCDMA Common Pilot Channel Signal (CPICH) transmitted using a primary scrambling code, and wherein adapting the impairment correlation estimates for the effects of scrambling codes being used to transmit the desired signal and the pilot signal comprises adapting the impairment correlation estimates for transmit power allocation differences between base station transmissions under the alternate and primary scrambling codes.

10. The method of claim 1, wherein adapting the impairment correlation estimates for the effects of transmitting the desired signal with a different scrambling code than used for transmitting the pilot signal comprises compensating elements of an impairment correlation estimate matrix corresponding to path delays of the desired signal for transmit power allocation differences associated with the primary and alternate scrambling codes.

11. The method of claim 1, wherein adapting the impairment correlation estimates for the effects of transmitting the desired signal with a different scrambling code than used for transmitting the pilot signal comprises comparing the adapted impairment correlation estimates determined with calculated impairment correlations determined from known data received in the desired signal, and using the adapted correlation estimates if they accurately approximate the calculated impairment correlations or otherwise using the calculated impairment correlations.

12. A receiver circuit for estimating impairment correlations for a desired signal in a received CDMA signal, the receiver circuit comprising one or more processing circuits configured to:
  determine impairment correlation estimates from a pilot signal in the received CDMA signal by determining an impairment covariance matrix having diagonal elements corresponding to cross-correlation values between the impairment components received at different desired signal delays of interest, and having off-diagonal elements corresponding to impairment cross-correlation values between pairs of the desired signal delays of interest; and
  adapt the impairment correlation estimates for effects of transmitting the desired signal with a different scrambling code than used for transmitting the pilot signal.

13. The receiver circuit of claim 12, wherein the one or more processing circuits of the receiver circuit are further configured to determine impairment correlation estimates from a pilot signal in the received CDMA signal by one of determining impairment correlations non-parametrically from despread pilot values obtained from the pilot signal and determining impairment correlations parametrically from despread pilot values obtained from the pilot signal.

14. The receiver circuit of claim 12 wherein the one or more processing circuits of the receiver circuit are further configured to generate channel estimates from the pilot signal.

15. The receiver circuit of claim 12, wherein the receiver circuit is configured to adapt the impairment correlation estimates for the effects of different scrambling codes being used to transmit the desired signal and the pilot signal by compensating at least the diagonal elements of the impairment covariance matrix as a function of transmit power allocations for a first scrambling code used in transmitting the pilot signal and a second scrambling code used in transmitting the desired signal.

16. The receiver circuit of claim 15, wherein compensating at least the diagonal elements of the impairment covariance matrix as a function of transmit power allocations for a first scrambling code used in transmitting the pilot signal and a second scrambling code used in transmitting the desired signal comprises limiting compensation to the diagonal elements if the received signal processing delays are chip-spaced, and compensating the diagonal elements and one or more off-diagonal elements if the received signal processing delays are not chip-spaced.

17. The receiver circuit of claim 15, wherein the one or more processing circuits comprising the receiver circuit are further configured to simplify compensating the diagonal elements of the covariance matrix by approximating a transmit power allocation for the second scrambling code as negligible compared to a transmit power allocation for the first scrambling code.

18. The receiver circuit of claim 12, wherein the receiver circuit or one or more additional circuits is configured to perform one or more signal processing operations with respect to the desired signal based on the impairment correlation estimates by at least one of computing a received signal quality for the desired signal as a function of the impairment correlation estimates, and computing weighting values for signal whitening in an associated Generalized Rake combining or chip equalization process.

19. The receiver circuit of claim 12, wherein the receiver circuit is configured to adapt the impairment correlation estimates for the effects of transmitting the desired signal with a different scrambling code than used for transmitting the pilot signal by compensating elements of an estimated impairment correlation matrix that correspond to path delays of the desired signal based on a correction term that depends on transmit power allocations for a first scrambling code associated with the pilot signal and a second scrambling code associated with the desired signal.

20. The receiver circuit of claim 12, wherein the desired signal comprises a Wideband CDMA (WCDMA) Dedicated Physical Channel (DPCH) signal transmitted using an alternate scrambling code and the pilot signal comprises a WCDMA Common Pilot Channel Signal (CPICH) transmitted using a primary scrambling code, and wherein the receiver circuit is configured to adapt the impairment correlation estimates for the effects of different scrambling codes being used to transmit the desired signal and the pilot signal by adapting the impairment correlation estimates for transmit power allocation differences between base station transmissions under the alternate and primary scrambling codes.

21. The receiver circuit of claim 12, wherein the receiver circuit is configured to adapt the impairment correlation estimates for the effects of transmitting the desired signal with a different scrambling code than used for transmitting the pilot signal by compensating elements of an impairment correlation estimate matrix corresponding to path delays of the desired signal for transmit power allocation differences associated with the primary and alternate scrambling codes.

22. The receiver circuit of claim 12, wherein the receiver circuit is configured to adapt the impairment correlation estimates for the effects of transmitting the desired signal with a different scrambling code than used for transmitting the pilot signal by comparing the adapted impairment correlation estimates determined with calculated impairment correlations determined from known data received in the desired signal, and using the adapted correlation estimates if they accurately approximate the calculated impairment correlations or otherwise using the calculated impairment correlations.

23. A wireless communication device for operation in a wireless communication network and including the receiver circuit of claim 12.

24. A method of determining impairment correlations for a desired signal comprising:
estimating an impairment correlation matrix based on a pilot signal received in conjunction with the desired signal by determining an impairment covariance matrix having diagonal elements corresponding to cross-correlation values between the impairment components received at different desired signal delays of interest, and having off-diagonal elements corresponding to impairment cross-correlation values between pairs of the desired signal delays of interest; and
compensating selected elements of the impairment correlation matrix corresponding to signal delays of the desired signal for transmission scrambling code differences between the pilot and desired signals.

25. The method of claim 24, wherein the pilot signal is transmitted using a primary scrambling code and the desired signal is transmitted using an alternate scrambling code, and wherein compensating the selected elements of the impairment correlation matrix comprises determining one or more correction terms for the selected elements as a function of transmit power allocation differences between the primary and alternate scrambling codes.

\* \* \* \* \*

UNITED STATES PATENT AND TRADEMARK OFFICE
CERTIFICATE OF CORRECTION

PATENT NO. : 7,929,591 B2
APPLICATION NO. : 11/552573
DATED : April 19, 2011
INVENTOR(S) : Lindoff et al.

It is certified that error appears in the above-identified patent and that said Letters Patent is hereby corrected as shown below:

In Column 1, Line 30, in Equation (1), delete " $[h_{d-1}^D]^{\tilde{T}}$ " and insert -- $[h_{d-1}^D]^T$ --, therefor.

In Column 2, Line 61, delete "DPICH" and insert -- DPCH --, therefor.

Signed and Sealed this
Fourth Day of October, 2011

David J. Kappos
*Director of the United States Patent and Trademark Office*